United States Patent
Haga (10) Patent No.: US 11,995,919 B2
(45) Date of Patent: May 28, 2024

(54) BATTERY DIAGNOSTIC DEVICE, BATTERY DIAGNOSTIC METHOD, BATTERY DIAGNOSTIC PROGRAM, AND VEHICLE

(71) Applicant: TOYOTA JIDOSHA KABUSHIKI KAISHA, Toyota (JP)

(72) Inventor: Nobuyasu Haga, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/349,405

(22) Filed: Jun. 16, 2021

(65) Prior Publication Data

US 2022/0058892 A1    Feb. 24, 2022

(30) Foreign Application Priority Data

Aug. 21, 2020    (JP) ................. 2020-140178

(51) Int. Cl.
   - *G07C 5/00* (2006.01)
   - *G07C 5/08* (2006.01)
   - *H01M 10/42* (2006.01)

(52) U.S. Cl.
   CPC ........... *G07C 5/008* (2013.01); *G07C 5/0808* (2013.01); *H01M 10/4285* (2013.01); *H01M 2220/20* (2013.01)

(58) Field of Classification Search
   CPC . G07C 5/008; G07C 5/0808; H01M 10/4285; H01M 2220/20; Y02E 60/10; G01R 31/392; G01R 31/367; G01R 31/3842; G01R 31/389; B60R 16/033
   See application file for complete search history.

(56) References Cited

U.S. PATENT DOCUMENTS

| 8,996,241 B2 * | 3/2015 | Uchida .............. H01M 10/425 |
| | | 701/29.6 |
| 2006/0181245 A1 | 8/2006 | Mizuno et al. |
| 2015/0046108 A1 | 2/2015 | Akamine |
| 2019/0120910 A1 * | 4/2019 | Ghantous ............. G01R 31/392 |
| 2020/0244089 A1 | 7/2020 | Nishida |
| 2020/0266647 A1 * | 8/2020 | Ramachandran ..... H01M 10/48 |

FOREIGN PATENT DOCUMENTS

| CN | 110707830 A | * | 1/2020 | .............. H02H 9/04 |
| JP | 2006-220616 A | | 8/2006 | |
| JP | 2012-102640 A | | 5/2012 | |
| JP | 2013-190274 A | | 9/2013 | |
| JP | 2014-034897 A | | 2/2014 | |
| JP | 2020-119830 A | | 8/2020 | |
| WO | WO-2017050945 A1 | * | 3/2017 | ......... G01R 31/3648 |

OTHER PUBLICATIONS

Machine Translation WO 2017050945 (Year: 2017).*
Machine Translation WO-2017050945-A1 (Year: 2017).*
Machine Translation CN-110707830-A (Year: 2020).*

* cited by examiner

*Primary Examiner* — Anne Marie Antonucci
*Assistant Examiner* — Lidia Kwiatkowska
(74) *Attorney, Agent, or Firm* — Oblon, McClelland, Maier & Neustadt, L.L.P.

(57) ABSTRACT

A battery diagnostic device for diagnosing a state of a battery mounted on a vehicle includes: an acquisition unit that acquires a physical quantity indicating the state of the battery; a setting unit that sets one diagnostic model from two or more diagnostic models based on the physical quantity acquired by the acquisition unit; and an estimation unit that estimates a deterioration state of the battery based on the one diagnostic model set by the setting unit.

10 Claims, 9 Drawing Sheets

BATTERY DIAGNOSTIC DEVICE, BATTERY DIAGNOSTIC METHOD, BATTERY DIAGNOSTIC PROGRAM, AND VEHICLE

CROSS-REFERENCE TO RELATED APPLICATION

This application claims priority to Japanese Patent Application No. 2020-140178 filed on Aug. 21, 2020, incorporated herein by reference in its entirety.

BACKGROUND

1. Technical Field

The present disclosure relates to a battery diagnostic device and the like for diagnosing a state of a battery mounted on a vehicle.

2. Description of Related Art

Japanese Unexamined Patent Application Publication No. 2006-220616 (JP 2006-220616 A) discloses a technique for estimating a deterioration state of a battery mounted on a vehicle with high accuracy by calculation using an artificial intelligence (AI) model such as a neural network. In the technique of JP 2006-220616 A, a neural network calculation is performed by inputting battery voltage, current, and internal resistance as parameters into an AI model (diagnostic model) for diagnosis to output, as a result of the calculation, a parameter indicating a deterioration state of the battery.

SUMMARY

Physical quantities such as voltage and internal resistance that can be obtained from the battery vary depending on the configuration of a device connected to the battery. For example, a battery to which a protection circuit, which is an example of the device, is connected has a smaller voltage drop during discharge because the current is limited by the protection circuit during discharge, and the voltage is higher than that of a battery to which a protection circuit is not connected.

Therefore, in the neural network calculation method using the single diagnostic model disclosed in JP 2006-220616 A described above, even if the same battery is used, the output result will be different if the connected devices are different, which causes an issue that the estimation accuracy of the deterioration state is lowered.

The present disclosure has been made in view of the above issue, and an object of the present disclosure is to provide a battery diagnostic device or the like capable of improving the estimation accuracy of the deterioration state of the battery.

In order to solve the above issue, an aspect of the disclosed technology is a battery diagnostic device for diagnosing a state of a battery mounted on a vehicle. The battery diagnostic device includes: an acquisition unit that acquires a physical quantity indicating the state of the battery; a setting unit that sets one diagnostic model from two or more diagnostic models based on the physical quantity acquired by the acquisition unit; and an estimation unit that estimates a deterioration state of the battery based on the one diagnostic model set by the setting unit.

Another aspect of the disclosed technology is a battery deterioration estimation method executed by a computer of a battery diagnostic device for diagnosing a state of a battery mounted on a vehicle, and a battery deterioration estimation program executed by a computer of a battery diagnostic device. The battery deterioration estimation method and the battery deterioration estimation program includes: a step of acquiring a physical quantity indicating the state of the battery; a step of setting one diagnostic model from two or more diagnostic models based on the acquired physical quantity; and a step of estimating a deterioration state of the battery based on the set one diagnostic model.

According to the battery diagnostic device described above of the present disclosure, a suitable diagnostic model is set from two or more diagnostic models based on the physical quantity of the battery, and a deterioration state of the battery is estimated based on the set diagnostic model. Thus, the estimation accuracy of the deterioration state of the battery can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A battery diagnostic device of the present disclosure sets a suitable diagnostic model from two or more diagnostic models based on the physical quantity of a battery mounted on a vehicle, and estimates a deterioration state of the battery based on the set diagnostic model. As a result, the estimation accuracy of the deterioration state of the battery can be improved. Hereinafter, embodiments of the present disclosure will be described in detail with reference to the drawings.

First Embodiment

Configuration

Figure 1:
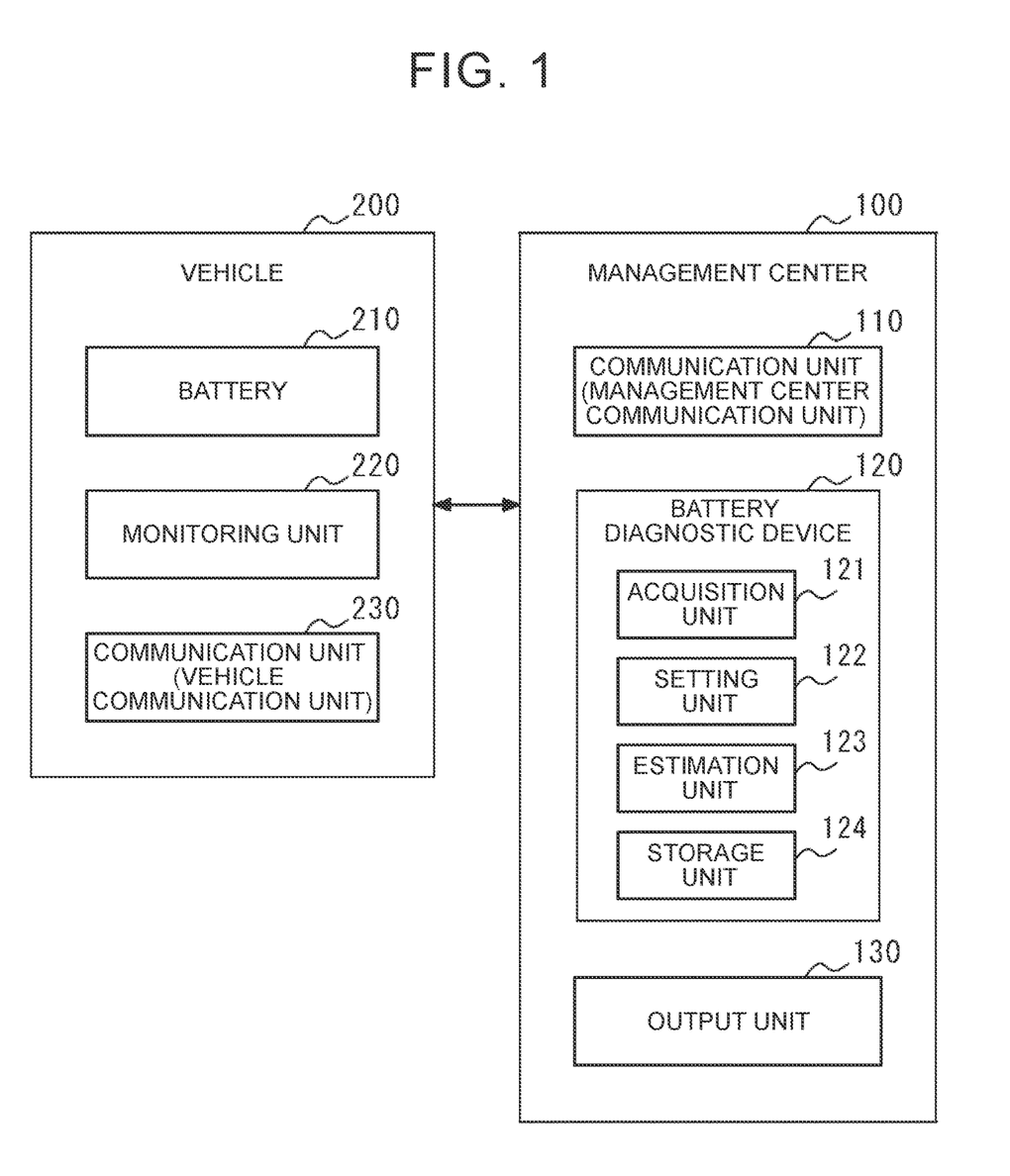
FIG. 1 is a functional block diagram of a battery diagnostic device according to a first embodiment and a peripheral portion thereof.

FIG. 1 is a functional block diagram of a battery diagnostic device according to a first embodiment and a peripheral portion thereof. The functional block illustrated in FIG. 1 includes a management center 100 having a battery diagnostic device 120 of the present disclosure, and a vehicle 200 connected to the management center 100 via communication. Although FIG. 1 shows an example in which one vehicle 200 is connected to the management center 100, two or more vehicles 200 may be connected thereto.

The vehicle 200 includes a battery 210, a monitoring unit 220, and a communication unit 230. In order to distinguish the communication unit in an easy-to-understand manner, the communication unit 230 on the vehicle 200 side is hereinafter referred to as "vehicle communication unit 230".

The battery 210 is a chargeable/dischargeable secondary battery such as a lead-acid battery or a lithium ion battery. The battery 210 can be, for example, an auxiliary battery mounted on the vehicle 200 as a power supply/storage source.

The monitoring unit 220 monitors the battery 210 using a detection device such as a sensor, and can detect a physical quantity indicating the state of the battery 210. Examples of the physical quantity indicating the state of the battery 210 include voltage, current, temperature, internal resistance, and state of charge (SOC). The internal resistance and the SOC can be calculated from the voltage, the current, the temperature, and the like. Further, the monitoring unit 220 can detect the period during which the battery 210 is mounted on the vehicle 200, that is, the time elapsed since the battery 210 is electrically connected to the vehicle 200 (hereinafter referred to as "usage time"). Further, the monitoring unit 220 can detect the time during which the vehicle 200 is stopped with the power supply system turned off (hereinafter referred to as "parking time").

The vehicle communication unit 230 has a configuration capable of wireless or wired communication with the management center 100. The vehicle communication unit 230 transmits a physical quantity indicating the state of the battery 210 detected by the monitoring unit 220 to the management center 100 at a predetermined timing. Further, if necessary, the vehicle communication unit 230 transmits one or both of the usage time of the battery 210 and the parking time of the vehicle 200 to the management center 100 at a predetermined timing.

The management center 100 is a facility connected to one or more vehicles 200 to collect and manage predetermined vehicle information from each vehicle 200. The management center 100 includes a communication unit 110, a battery diagnostic device 120, and an output unit 130. In order to distinguish the communication units in an easy-to-understand manner, the communication unit 110 on the management center 100 side is hereinafter referred to as "management center communication unit 110".

The management center communication unit 110 has a configuration capable of wireless or wired communication with the vehicle 200. The management center communication unit 110 receives a physical quantity transmitted by the vehicle communication unit 230 indicating the state of the battery 210 of the vehicle 200. Further, the management center communication unit 110 receives one or both of the usage time of the battery 210 in the vehicle 200 and the parking time of the vehicle 200 transmitted by the vehicle communication unit 230.

The battery diagnostic device 120 has a configuration for diagnosing the state of the battery 210 mounted on the vehicle 200, and more specifically, for diagnosing the deterioration of the battery 210. The battery diagnostic device 120 includes an acquisition unit 121, a setting unit 122, an estimation unit 123, and a storage unit 124.

The acquisition unit 121 acquires a part or all of the physical quantity indicating the state of the battery 210 received from the vehicle 200 by the management center communication unit 110, the usage time of the battery 210, and the parking time of the vehicle 200.

The setting unit 122 selects one diagnostic model from two or more diagnostic models prepared in advance based on a part or all of the physical quantity indicating the state of the battery 210, the usage time of the battery 210, the parking time of the vehicle 200, and the like acquired by the acquisition unit 121, and sets the selected diagnostic model as a diagnostic model used for estimating battery deterioration. The diagnostic model and the setting method of the diagnostic model will be described later.

The estimation unit 123 estimates the deterioration state of the battery 210 using the diagnostic model set by the setting unit 122. The estimation of the deterioration state can be realized by performing a predetermined neural network operation using this diagnostic model.

The storage unit 124 stores two or more diagnostic models. This diagnostic model is an artificial intelligence (AI) model such as a neural network that can input the physical quantity of the battery 210 as a parameter and output a parameter indicating the deterioration state of the battery as a calculation result. In the present embodiment, the storage unit 124 stores at least a first diagnostic model that is machine-learned based on the voltage of the battery 210 to which the protection circuit for suppressing the discharge amount is connected, and a second diagnostic model that is machine-learned based on the voltage of the battery 210 to which the protection circuit is not connected. Examples of such a protection circuit include an inrush current reduction (ICR) relay provided in a vehicle equipped with a start-and-stop (S & S) function. Needless to say, in addition to the first diagnostic model and the second diagnostic model, various diagnostic models can be stored according to the purpose of the diagnosis and the desired diagnostic content. For example, when there is a plurality of types of protection circuit configurations, it is possible to prepare a plurality of diagnostic models according to the types.

In addition, in FIG. 1, the configuration in which the storage unit 124 for storing the diagnostic models is included in the battery diagnostic device 120 is illustrated. However, the configuration may be such that the storage unit 124 is provided in the management center 100 outside the battery diagnostic device 120, or provided in an external configuration outside the management center 100 (the vehicle 200 or a configuration other than the vehicle 200). In the latter case, the setting unit 122 may acquire the diagnostic models from the external configuration via the management center communication unit 110.

The output unit 130 is configured to output (provide, utilize) the result including the estimated deterioration state of the battery 210 diagnosed by the battery diagnostic device 120. For example, the output unit 130 may feed back the battery diagnosis result to the vehicle 200 via the management center communication unit 110, or provide the battery diagnosis result to an external device other than the vehicle 200 (a user's smartphone or a terminal of a vehicle dealer, etc.). Further, the output unit 130 may display the battery diagnosis result on a screen of a display device (not shown) or the like included in the management center 100.

A part or all of the battery diagnostic device 120 described above can typically be configured as an electronic control unit (ECU) including a processor, a memory, an input/output interface, and the like such as a microcomputer. This electronic control unit can realize some or all of the functions of the acquisition unit 121, the setting unit 122, and the estimation unit 123 when the processor reads and executes the program stored in the memory.

Control

Next, with reference to FIGS. 2 to 6, some examples of battery diagnostic control executed by the battery diagnostic device 120 according to the first embodiment of the present disclosure will be described.

(1) First Example

Figure 2:
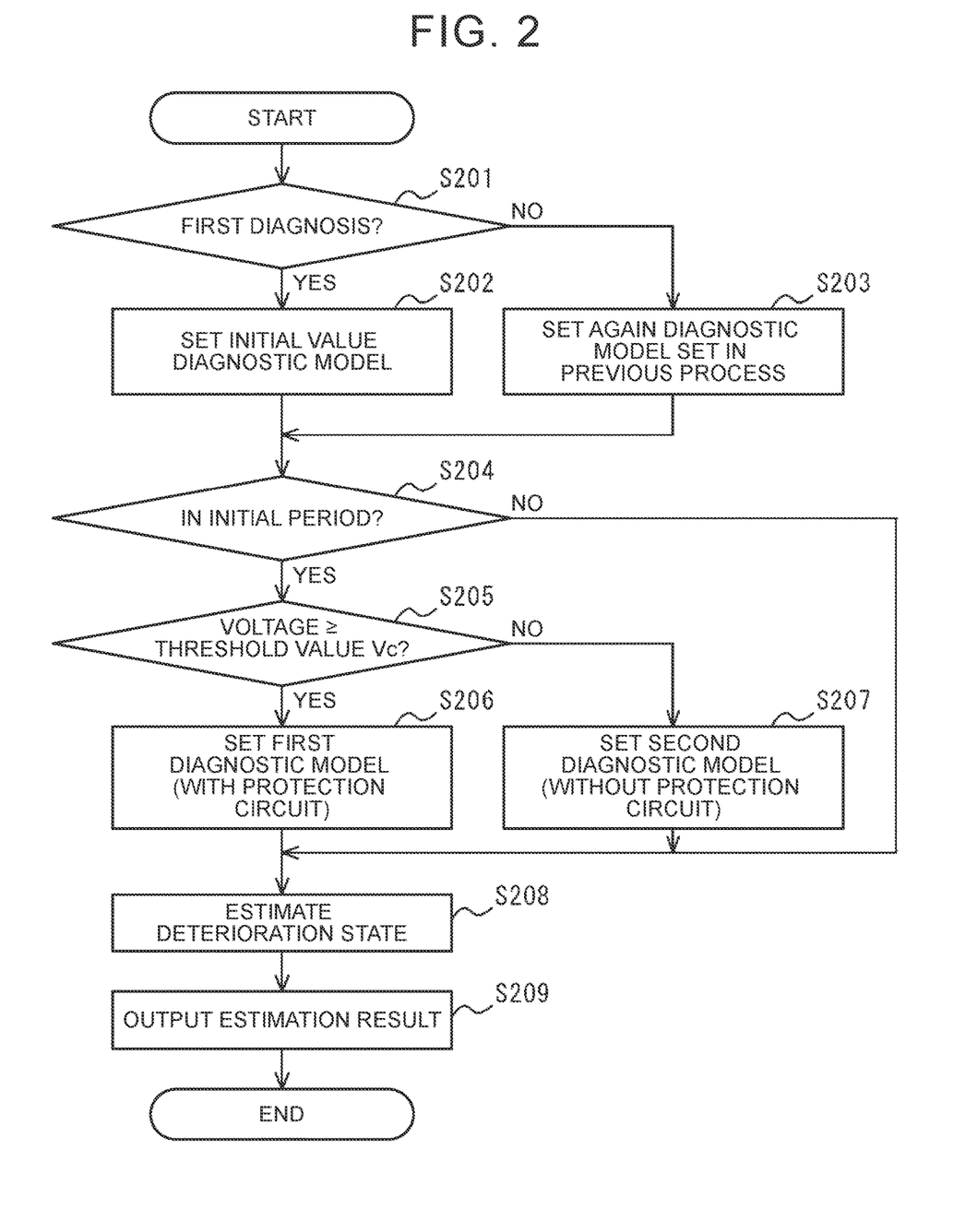
FIG. 2 is a flowchart showing a processing procedure of a first example of battery diagnostic control.

FIG. 2 is a flowchart showing a processing procedure of a first example of battery diagnostic control executed by the battery diagnostic device 120.

The battery diagnostic control shown in FIG. 2 is started when the acquisition unit 121 acquires a physical quantity indicating the state of the battery 210 from the management center communication unit 110. In the first example, a case where the voltage and the usage time of the battery 210 are acquired as physical quantities will be described. The acquisition of the voltage and the usage time of the battery 210 is typically performed at any time in accordance with a predetermined timing (ignition ON, etc.) set in advance in the vehicle 200.

Step S201

The setting unit 122 determines whether the diagnosis based on the voltage acquired by the acquisition unit 121 is the first diagnosis for the target battery 210. This determination can be realized, for example, when the monitoring unit 220 of the vehicle 200 transmits the detected voltage of the battery 210 to the management center 100 in association with unique information (identification ID, etc.) that can uniquely identify the battery 210, and the setting unit 122 recognizes this received unique information. When it is the first diagnosis (S201: YES), the process proceeds to step S202, and when it is not the first diagnosis (S201: NO), the process proceeds to step S203.

Step S202

The setting unit 122 sets a predetermined initial value diagnostic model as a diagnostic model used for estimating battery deterioration. The initial value diagnostic model is the above-mentioned first diagnostic model (model for a battery with a protection circuit) or second diagnostic model (model for a battery without a protection circuit). In order to avoid erroneous deterioration estimation, when the target battery is a battery with less deterioration during the initial period (described later), it is preferable to set the second diagnostic model to the initial value, and when the target battery is a battery that deteriorates frequently during the initial period, it is preferable to set the first diagnostic model as the initial value. When the initial value diagnostic model is set, the process proceeds to step S204.

Step S203

The setting unit 122 sets again the diagnostic model set in the previous diagnosis as a (provisional) diagnostic model used for estimating battery deterioration. Note that the diagnostic model is newly set in any one of step S202, step S206, and S207 described later. When the previous diagnostic model is set again, the process proceeds to step S204.

Step S204

The setting unit 122 determines whether the current state is a predetermined initial period based on the usage time of the battery 210 acquired by the acquisition unit 121. The initial period is the period from when the battery 210 is mounted on the vehicle 200 until when the first time has elapsed. The first time is a predetermined value set based on the performance/characteristics of the battery 210, the function of the vehicle 200, and the like, and can be, for example, one year. Mounting the battery on the vehicle refers to the act of assembling the battery to the vehicle for the first time in the manufacturing process, or the act of replacing the old battery mounted on the vehicle with a new battery. When the current state is the initial period (S204: YES), the process proceeds to step S205, and when the current state is not the initial period (S204: NO), the process proceeds to step S208.

Step S205

The setting unit 122 determines whether the voltage of the battery 210 acquired by the acquisition unit 121 is equal to or higher than the threshold value Vc. The threshold value Vc (first threshold value) is a predetermined voltage value for determining whether a protection circuit for suppressing the discharge amount is connected to the battery 210. For example, the threshold value Vc is set to a value between the voltage (standard value, average value, deviation value, etc.) of the battery 210 to which the protection circuit is connected and the voltage (standard value, average value, deviation value, etc.) of the battery 210 to which the protection circuit is not connected. When the voltage of the battery 210 is equal to or higher than the threshold value Vc (S205: YES), the process proceeds to step S206, and when the voltage of the battery 210 is lower than the threshold value Vc (S205: NO), the process proceeds to step S207.

Step S206

The setting unit 122 sets the first diagnostic model as a diagnostic model used for estimating battery deterioration. This first diagnostic model is a diagnostic model that is machine-learned based on the voltage of the battery 210 to which the protection circuit is connected (battery 210 with the protection circuit). When the first diagnostic model is set, the process proceeds to step S208.

Step S207

The setting unit 122 sets the second diagnostic model as a diagnostic model used for estimating battery deterioration. This second diagnostic model is a diagnostic model that is machine-learned based on the voltage of the battery 210 to which the protection circuit is not connected (battery 210 without the protection circuit). When the second diagnostic model is set, the process proceeds to step S208.

Step S208

The estimation unit 123 estimates the deterioration state of the battery 210 using the diagnostic model (first diagnostic model or second diagnostic model) set by the setting unit 122. The deterioration state is estimated based on the result obtained by inputting the voltage of the battery 210 acquired by the acquisition unit 121 to the diagnostic model as a parameter and performing the neural network calculation. As a result, the probability of causing a predetermined deterioration (or the probability of not causing the deterioration) during the initial period can be exemplified. In this case, when the probability is higher than a predetermined value, it can be estimated that the battery 210 is in a deterioration state. When the deterioration state of the battery 210 is estimated, the process proceeds to step S209.

Step S209

The estimation unit 123 outputs the battery diagnosis result including the estimated deterioration state of the battery 210 to the output unit 130. Thus, this battery diagnostic control ends.

As described above, in the first example of the battery diagnostic control, during the initial period in which the presence/absence of the protection circuit can be clearly determined, the diagnostic model set each time among a plurality of diagnostic models based on the voltage of the battery 210 that fluctuates depending on the presence/absence of the protection circuit is used to estimate the deterioration of the battery. After the initial period has elapsed, the diagnostic model set at the end of the initial period is continuously used for estimating the deterioration of the battery. As a result, the estimation accuracy of the deterioration state of the battery 210 can be improved.

(2) Second Example

Figure 3:
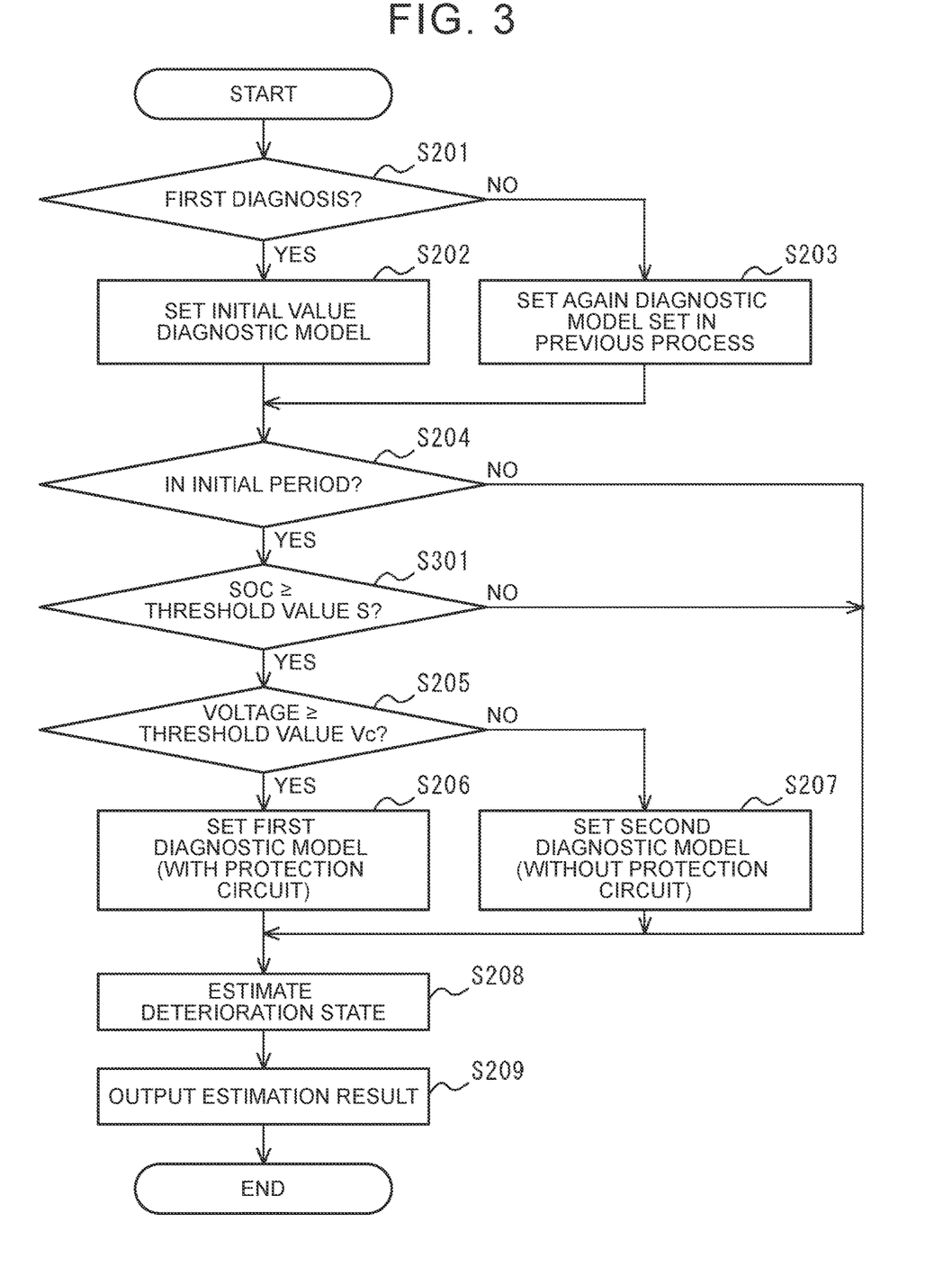
FIG. 3 is a flowchart showing a processing procedure of a second example of the battery diagnostic control.

FIG. 3 is a flowchart showing a processing procedure of a second example of battery diagnostic control executed by the battery diagnostic device 120. The battery diagnostic control of the second example is obtained by adding a process of avoiding an erroneous diagnosis when the accuracy (reliability) of the voltage of the battery 210 acquired by the acquisition unit 121 is low to the battery diagnostic control of the first example (FIG. 2). Specifically, the process of step S301 is executed between step S204 and step S205. Since the processes other than step S301 in the second example is the same as the processes in the first example, a part thereof will be omitted here.

The battery diagnostic control shown in FIG. 3 is started when the acquisition unit 121 acquires a physical quantity indicating the state of the battery 210 from the management center communication unit 110. In the second example, a case where the voltage, the SOC, and the usage time of the battery 210 are acquired as physical quantities will be described. The acquisition of the voltage, the SOC, and the usage time of the battery 210 is typically performed at any time in accordance with a predetermined timing (ignition ON, etc.) set in advance in the vehicle 200.

Step S204

The setting unit 122 determines whether the current state is the predetermined initial period based on the usage time of the battery 210 acquired by the acquisition unit 121. When the current state is the initial period (S204: YES), the process proceeds to step S301, and when the current state is not the initial period (S204: NO), the process proceeds to step S208.

Step S301

The setting unit 122 determines whether the SOC of the battery 210 is equal to or higher than the threshold value S. The threshold value S (third threshold value) is a predetermined SOC for determining whether the accuracy of the voltage of the battery 210 acquired by the acquisition unit 121 is high. For example, the threshold value S is set to a SOC at which the rate of change of the open end voltage (OCV) of the battery 210 switches from flat to steep in the SOC-OCV characteristic curve.

When the SOC of the battery 210 is equal to or higher than the threshold value S (S301: YES), it is determined that the accuracy (reliability) of the voltage of the battery 210 is high, thereby the process proceeds to step S205, and the setting unit 122 performs a process for newly setting a diagnostic model based on the voltage of the battery 210. On the other hand, when the SOC of the battery 210 is lower than the threshold value S (S301: NO), it is determined that the accuracy (reliability) of the voltage of the battery 210 is low, and the process proceeds to step S208. In this case, the setting unit 122 does not set a new diagnostic model based on the voltage of the battery 210.

As described above, in the second example of the battery diagnostic control, during the initial period in which the presence/absence of the protection circuit can be clearly determined, while using the diagnostic model set each time among a plurality of diagnostic models based on the voltage of the battery 210 that fluctuates depending on the presence/absence of the protection circuit to estimate the deterioration of the battery, when the accuracy (reliability) of the voltage of the battery 210 is low, the previously set diagnostic model is continuously used to estimate the deterioration of the battery without setting a new diagnostic model. After the initial period has elapsed, the diagnostic model set at the end of the initial period is continuously used for estimating the deterioration of the battery, as in the first example. As a result, the estimation accuracy of the deterioration state of the battery 210 can be improved.

(3) Third Example

Figure 4A:
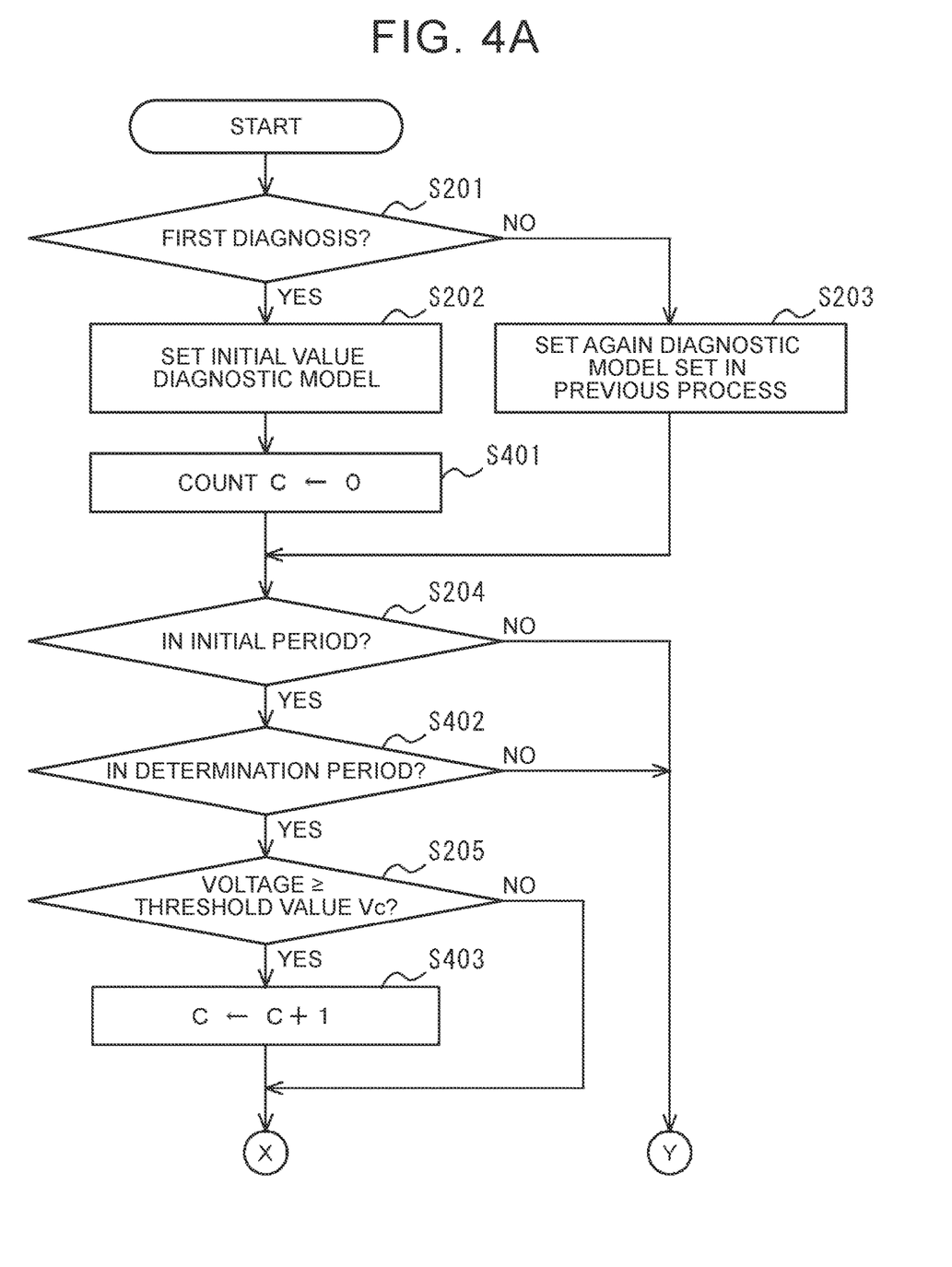
FIG. 4A is a flowchart showing a processing procedure of a third example of the battery diagnostic control.
Figure 4B:
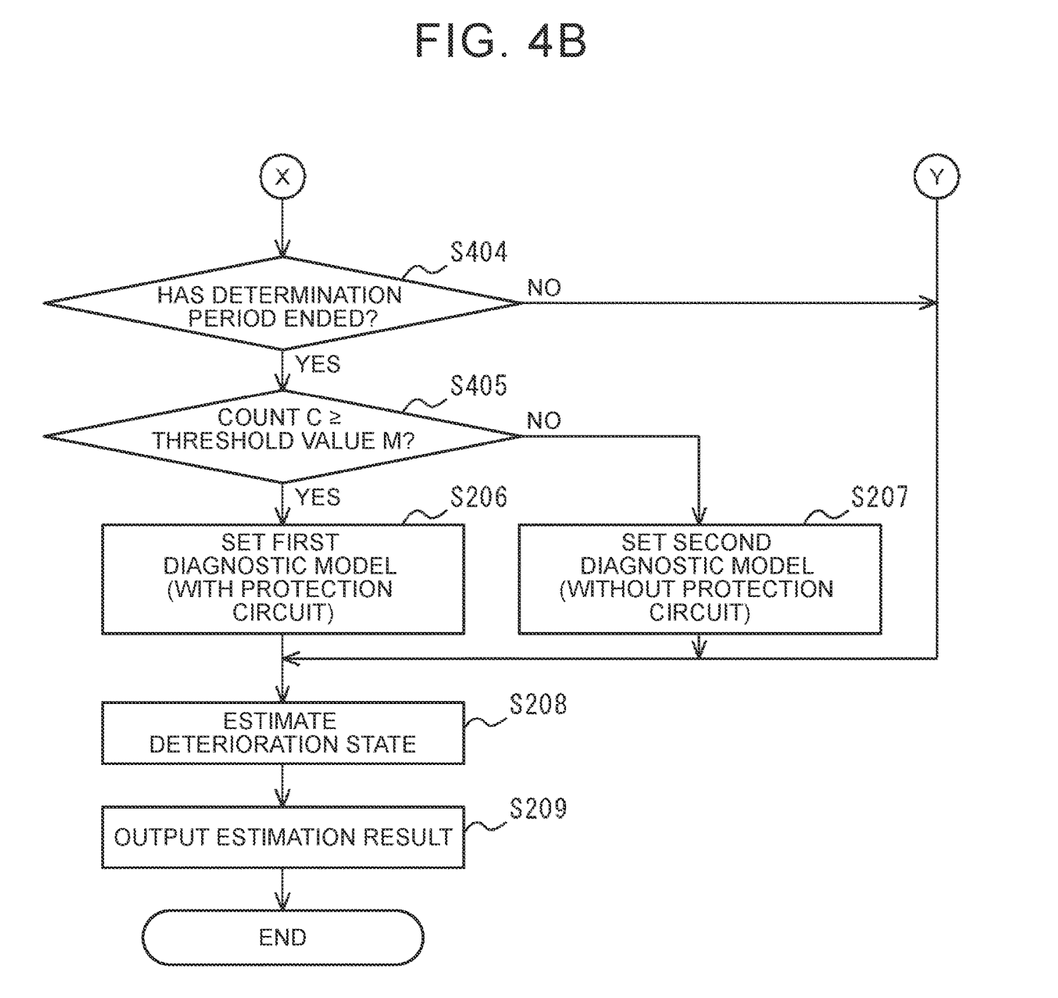
FIG. 4B is a flowchart showing a processing procedure of the third example of the battery diagnostic control.

FIG. 4A and FIG. 4B are flowcharts showing processing procedures of a third example of battery diagnostic control executed by the battery diagnostic device 120. The processes of FIG. 4A and the processes of FIG. 4B are connected by couplers X and Y. The battery diagnostic control of the third example is obtained by adding a process of eliminating the influence such as noise received by the voltage of the battery 210 acquired by the acquisition unit 121 to the battery diagnostic control of the first example (FIG. 2). Specifically, the processes of steps S401 to S405 are newly added to the processes of steps S201 to S209. Since the processes other than steps S401 to S405 in the third example is the same as the processes in the first example, a part thereof will be omitted here.

The battery diagnostic control shown in FIGS. 4A and 4B is started when the acquisition unit 121 acquires a physical quantity indicating the state of the battery 210 from the management center communication unit 110. In the third example, a case where the voltage and the usage time of the battery 210 are acquired as physical quantities will be described. The acquisition of the voltage and the usage time of the battery 210 is typically performed at any time in accordance with a predetermined timing (ignition ON, etc.) set in advance in the vehicle 200.

Step S202

The setting unit 122 sets a predetermined initial value diagnostic model (first diagnostic model or second diagnostic model) as a diagnostic model used for estimating battery deterioration. When the initial value diagnostic model is set, the process proceeds to step S401.

Step S401

The setting unit 122 resets the count C, which is a count value of a predetermined counter, to zero. This count C is used to accumulate the number of times the voltage of the battery 210 acquired by the acquisition unit 121 in step S205 is equal to or higher than the threshold value Vc. When the count C is set to zero, the process proceeds to step S204.

Step S204

The setting unit 122 determines whether the current state is the predetermined initial period based on the usage time of the battery 210 acquired by the acquisition unit 121. When the current state is the initial period (S204: YES), the process proceeds to step S402, and when the current state is not the initial period (S204: NO), the process proceeds to step S208.

Step S402

The setting unit 122 determines whether the current state is a predetermined determination period based on the usage time of the battery 210 acquired by the acquisition unit 121. The determination period is a period during which the final determination is suspended in order to eliminate the influence of noise on the voltage of the battery 210. In principle, this determination period is set to be the same as or shorter than the initial period (for example, 30 days). The determination period may be a period elapsed after the battery 210 is mounted on the vehicle, or may be an intermediate period within the initial period. When the current state is the determination period (S402: YES), the process proceeds to step S205, and when the current state is not the determination period (S402: NO), the process proceeds to step S208.

Step S205

The setting unit 122 determines whether the voltage of the battery 210 acquired by the acquisition unit 121 is equal to or higher than the threshold value Vc. When the voltage of the battery 210 is equal to or higher than the threshold value Vc (S205: YES), the process proceeds to step S403, and when the voltage of the battery 210 is lower than the threshold value Vc (S205: NO), the process proceeds to step S404.

Step S403

The setting unit 122 increments the count C by one. When the count C is incremented, the process proceeds to step S404.

Step S404

The setting unit 122 determines whether the determination period has ended. When the determination period has ended (S404: YES), the process proceeds to step S405, and when the determination period has not ended (S404: NO), the process proceeds to step S208.

Step S405

The setting unit 122 determines whether the count C is equal to or larger than the threshold value M. The threshold value M (second threshold value) is a predetermined value for determining whether the voltage of the battery 210 is equal to or higher than the threshold value Vc or lower than the threshold value Vc in consideration of the influence of noise. The threshold value M can be, for example, three times. When the count C is equal to or larger than the threshold value M (S405: YES), the process proceeds to step S206, and when the count C is smaller than the threshold value M (S405: NO), the process proceeds to step S207.

As described above, in the third example of the battery diagnostic control, during the initial period in which the presence/absence of the protection circuit can be clearly determined, the diagnostic model set each time among a plurality of diagnostic models based on the voltage of the battery 210 that fluctuates depending on the presence/absence of the protection circuit is used to estimate the deterioration of the battery in consideration of the influence of noise on the voltage of the battery 210. After the initial period has elapsed, the diagnostic model set at the end of the initial period is continuously used for estimating the deterioration of the battery. As a result, the estimation accuracy of the deterioration state of the battery 210 can be improved.

The battery diagnostic control of the third example describes a case where, when the determination that the voltage of the battery 210 is equal to or higher than the threshold value Vc is accumulated M times or more during the determination period, the first diagnostic model (model for a battery with a protection circuit) is set, and otherwise the second diagnostic model (model for a battery without a protection circuit) is set. However, in order to further eliminate the influence of noise, the first diagnostic model may be set when the determination that the voltage of the battery 210 is equal to or higher than the threshold value Vc is made M times or more continuously during the determination period, and otherwise a second diagnostic model may be set.

(4) Fourth Example

Figure 5A:
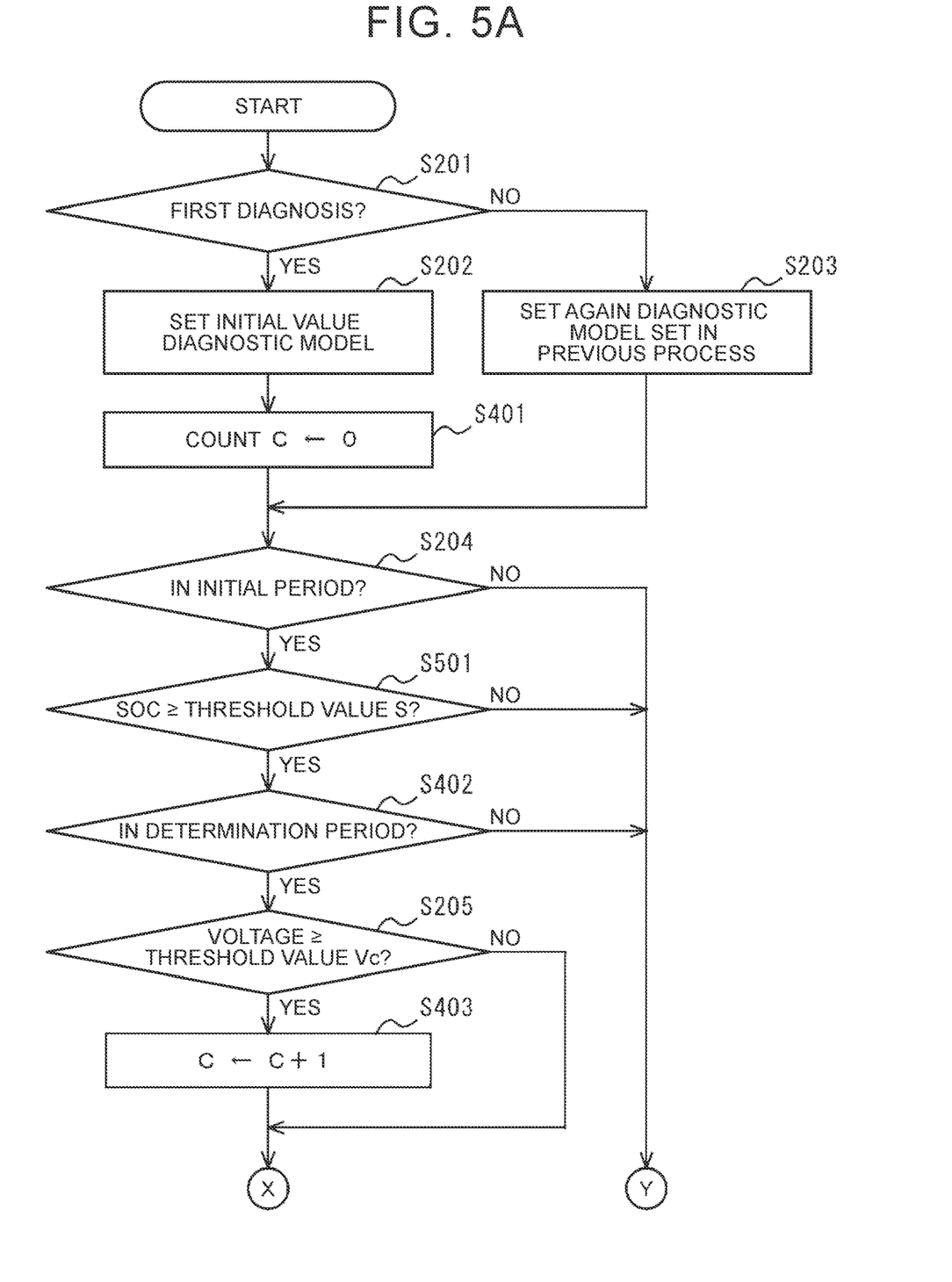
FIG. 5A is a flowchart showing a processing procedure of a fourth example of the battery diagnostic control.
Figure 5B:
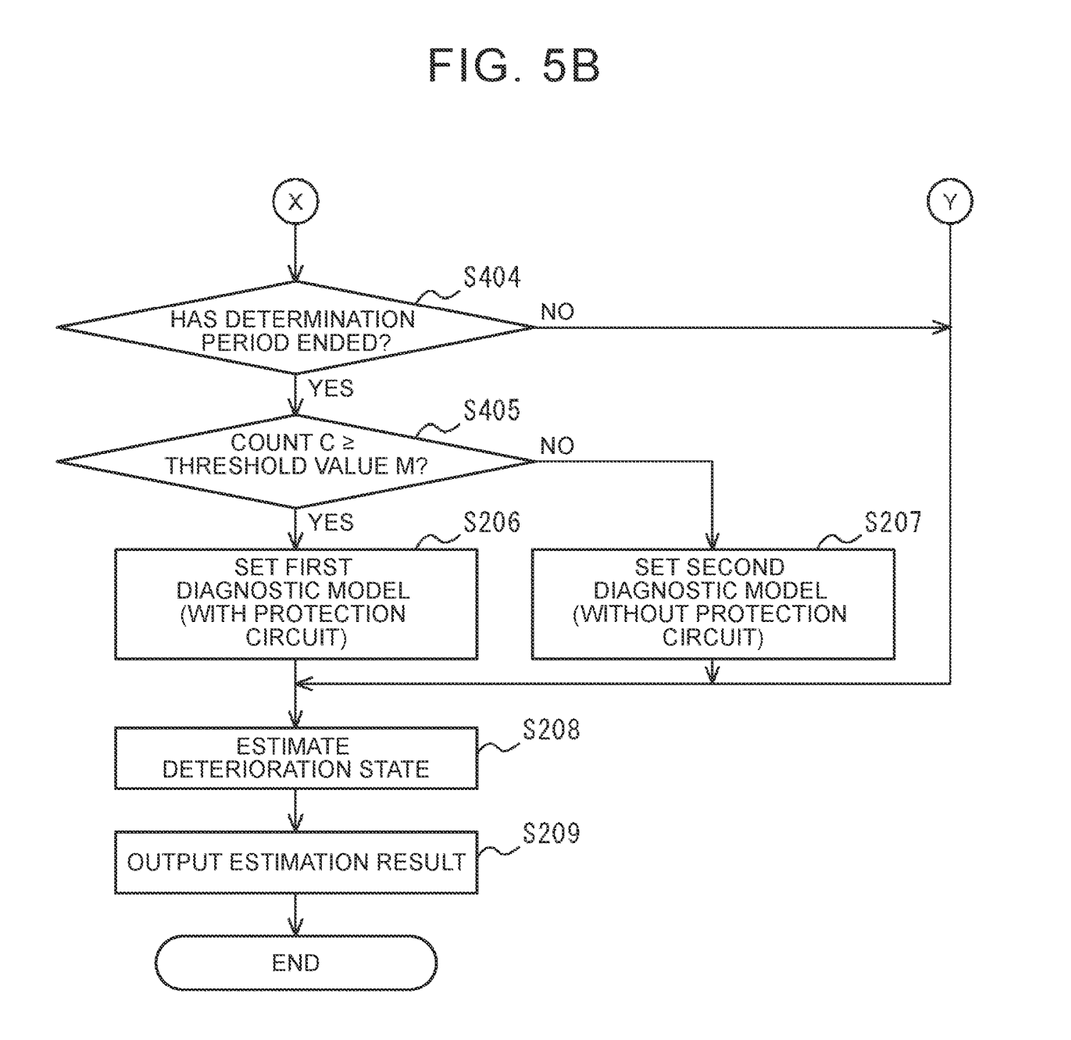
FIG. 5B is a flowchart showing a processing procedure of the fourth example of the battery diagnostic control.

FIG. 5A and FIG. 5B are flowcharts showing processing procedures of a fourth example of battery diagnostic control executed by the battery diagnostic device 120. The processes of FIG. 5A and the processes of FIG. 5B are connected by couplers X and Y. The battery diagnostic control of the fourth example is obtained by adding a process of avoiding an erroneous diagnosis when the accuracy (reliability) of the voltage of the battery 210 acquired by the acquisition unit 121 is low to the battery diagnostic control of the third example (FIGS. 4A and 4B). Specifically, the process of step S501 is executed between step S204 and step S402. Since the processes other than step S501 in the fourth example is the same as the processes in the first example and the third example, a part thereof will be omitted here.

The battery diagnostic control shown in FIGS. 5A and 5B is started when the acquisition unit 121 acquires a physical quantity indicating the state of the battery 210 from the management center communication unit 110. In the fourth example, a case where the voltage, the SOC, and the usage time of the battery 210 are acquired as physical quantities will be described. The acquisition of the voltage, the SOC, and the usage time of the battery 210 is typically performed at any time in accordance with a predetermined timing (ignition ON, etc.) set in advance in the vehicle 200.

Step S204

The setting unit 122 determines whether the current state is the predetermined initial period based on the usage time of the battery 210 acquired by the acquisition unit 121. When the current state is the initial period (S204: YES), the process proceeds to step S501, and when the current state is not the initial period (S204: NO), the process proceeds to step S208.

Step S501

The setting unit 122 determines whether the SOC of the battery 210 is equal to or higher than the threshold value S. The threshold value S (third threshold value) is a predetermined SOC for determining whether the accuracy of the voltage of the battery 210 acquired by the acquisition unit 121 is high. For example, the threshold value S is set to a SOC at which the rate of change of the OCV of the battery 210 switches from flat to steep in the SOC-OCV characteristic curve.

When the SOC of the battery 210 is equal to or higher than the threshold value S (S501: YES), it is determined that the voltage accuracy (reliability) of the battery 210 is high, thereby the process proceeds to step S402, and the setting unit 122 performs a process for newly setting a diagnostic model based on the voltage of the battery 210 during the determination period. On the other hand, when the SOC of the battery 210 is lower than the threshold value S (S501: NO), it is determined that the accuracy (reliability) of the voltage of the battery 210 is low, and the process proceeds to step S208. In this case, the setting unit 122 does not set a new diagnostic model based on the voltage of the battery 210.

As described above, in the fourth example of the battery diagnostic control, during the initial period in which the presence/absence of the protection circuit can be clearly determined, while using the diagnostic model set each time among a plurality of diagnostic models based on the voltage of the battery 210 that fluctuates depending on the presence/absence of the protection circuit to estimate the deterioration of the battery, when the accuracy (reliability) of the voltage of the battery 210 is low, the previously set diagnostic model is continuously used to estimate the deterioration of the battery without setting a new diagnostic model in consideration of the influence of noise on the voltage of the battery 210. After the initial period has elapsed, the diagnostic model set at the end of the initial period is continuously used for estimating the deterioration of the battery, as in the third example. As a result, the estimation accuracy of the deterioration state of the battery 210 can be improved.

(5) Fifth Example

Figure 6:
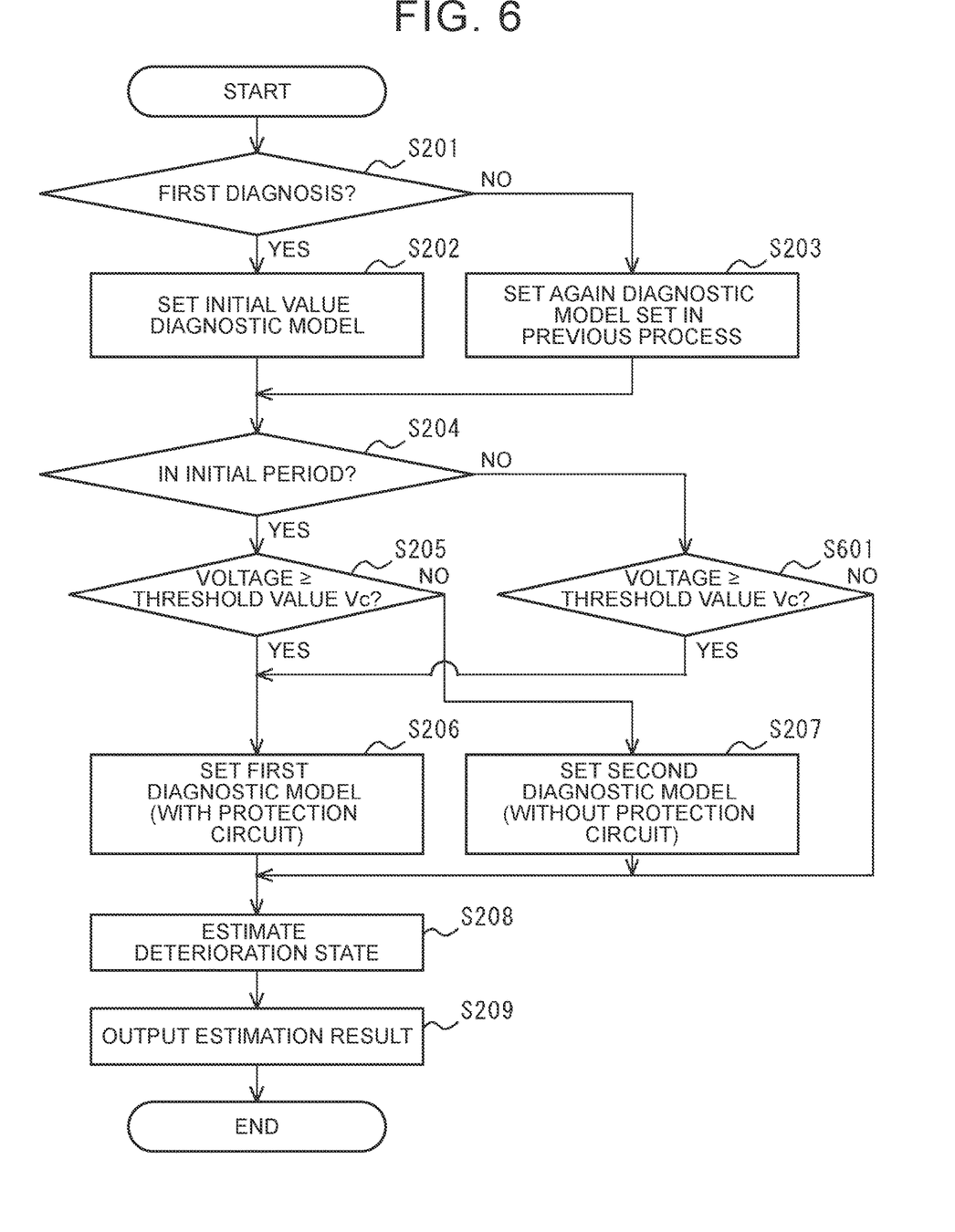
FIG. 6 is a flowchart showing a processing procedure of a fifth example of the battery diagnostic control.

FIG. 6 is a flowchart showing a processing procedure of a fifth example of battery diagnostic control executed by the battery diagnostic device 120. The battery diagnostic control of the fifth example is obtained by adding a process of setting a diagnostic model based on the voltage of the battery 210 even after the initial period has elapsed to the battery diagnostic control of the first example (FIG. 2). Specifically, the process of step S601 is newly added. Since the processes other than step S601 in the fifth example is the same as the processes in the first example, a part thereof will be omitted here.

Step S204

The setting unit 122 determines whether the current state is the predetermined initial period based on the usage time of the battery 210 acquired by the acquisition unit 121. When the current state is the initial period (S204: YES), the process proceeds to step S205, and when the current state is not the initial period (S204: NO), the process proceeds to step S601.

Step S601

The setting unit 122 determines whether the voltage of the battery 210 acquired by the acquisition unit 121 is equal to or higher than the threshold value Vc. When the voltage of the battery 210 is equal to or higher than the threshold value Vc (S601: YES), the process proceeds to step S206, and when the voltage of the battery 210 is lower than the threshold value Vc (S601: NO), the process proceeds to step S208.

As described above, in the fifth example of the battery diagnostic control, until the initial period elapses, one of the first diagnostic model (model for a battery with a protection circuit) and the second diagnostic model (model for a battery without a protection circuit) is set based on the voltage of the battery 210 that fluctuates depending on the presence/absence of the protection circuit. Then, after the initial period has elapsed, the setting change from the second diagnostic model to the first diagnostic model is allowed, and the setting change from the first diagnostic model to the second diagnostic model is prohibited based on the voltage of the battery 210. With this control, for example, even when an erroneous determination of the initial period occurs due to a battery having a low voltage (a battery having a reduced SOC) being mounted on the vehicle 200, the erroneous determination can be modified after the initial period has elapsed.

(6) Other Examples

In steps S202, S203, S206, and S207 of the battery diagnostic control of the first to fifth examples described above, instead of setting the diagnostic model, a flag may be set such that, for example, the first diagnostic model is designated when the flag is "1" and the second diagnostic model is designated when the flag is "0". In this case, before the process of step S208, a new step of setting either the first diagnostic model or the second diagnostic model with reference to the flag may be added.

Further, in step S301 of the battery diagnostic control of the second example and step S501 of the battery diagnostic control of the fourth example described above, instead of determining whether the SOC of the battery 210 is equal to or higher than the threshold value S, it may be determined whether the parking time of the vehicle 200 is equal to or longer than the threshold value P (fourth threshold value). Since the electric power of the battery 210 is consumed by dark current of an in-vehicle device while the vehicle 200 is parked, the longer the parking time, the lower the SOC of the battery 210. Therefore, for example, by setting the time at which the SOC of the battery 210 is expected to decrease from the fully charged amount to the threshold value S as the threshold value P and determining whether the parking time of the vehicle 200 is equal to or longer than the threshold value P, it is possible to determine whether the accuracy (reliability) of the voltage of the battery 210 is high or low.

Further, it is also possible to apply the determination process according to step S601 of the battery diagnostic control of the fifth example described above to the battery diagnostic controls of the second to fourth examples.

Second Embodiment

Configuration

Figure 7:
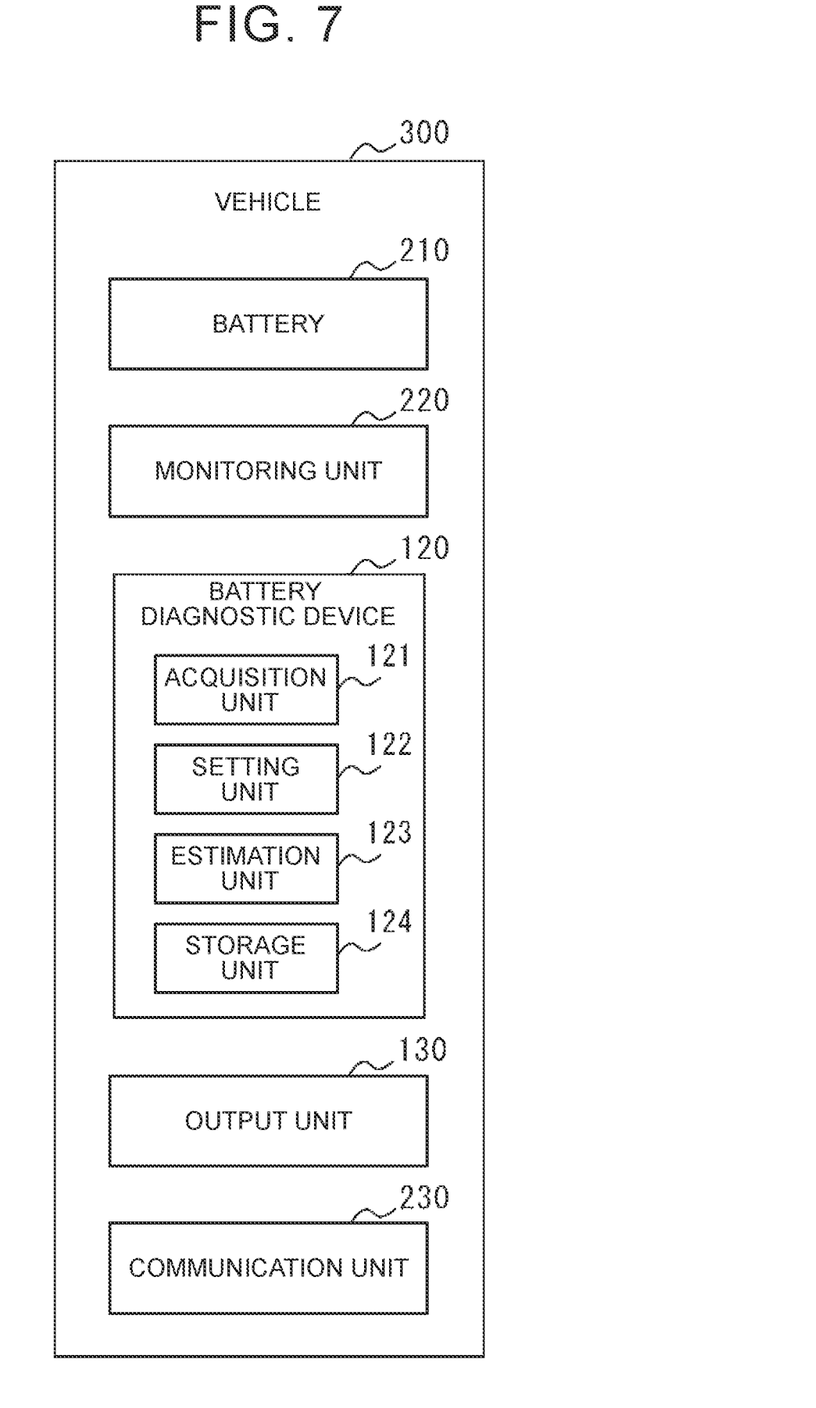
FIG. 7 is a functional block diagram of a battery diagnostic device according to a second embodiment and a peripheral portion thereof.

FIG. 7 is a functional block diagram of a battery diagnostic device according to a second embodiment and a peripheral portion thereof. As illustrated in the functional block of FIG. 7, the second embodiment includes the battery diagnostic device 120 in a vehicle 300 instead of in the management center 100 as in the first embodiment. The same reference signs are given to the same configurations in the first embodiment and the second embodiment. Hereinafter, the contents described in the first embodiment will be used as the basis, and the contents different in the second embodiment will be mainly described.

The vehicle 300 includes the battery 210, the monitoring unit 220, the battery diagnostic device 120, the output unit 130, and the communication unit 230.

The battery 210 is a chargeable/dischargeable secondary battery such as a lead-acid battery or a lithium ion battery. The battery 210 can be, for example, an auxiliary battery mounted on the vehicle 300 as a power supply/storage source.

The battery diagnostic device 120 has a configuration for diagnosing the state of the battery 210, and more specifically, for diagnosing the deterioration of the battery 210. The battery diagnostic device 120 includes the acquisition unit 121, the setting unit 122, the estimation unit 123, and the storage unit 124.

The acquisition unit 121 acquires a part or all of the physical quantity indicating the state of the battery 210, the usage time of the battery 210, and the parking time of the vehicle 300 detected by the monitoring unit 220.

The setting unit 122 selects one diagnostic model from two or more diagnostic models prepared in advance based on a part or all of the physical quantity indicating the state of the battery 210, the usage time of the battery 210, the parking time of the vehicle 300, and the like acquired by the acquisition unit 121, and sets the selected diagnostic model as a diagnostic model used for estimating battery deterioration.

The estimation unit 123 estimates the deterioration state of the battery 210 using the diagnostic model set by the setting unit 122. The estimation of the deterioration state can be realized by performing a predetermined neural network operation using this diagnostic model.

The storage unit 124 stores two or more diagnostic models. In the present embodiment, the storage unit 124 stores at least the first diagnostic model (model for a battery with a protection circuit) and the second diagnostic model (model for a battery without a protection circuit).

The output unit 130 is configured to output (provide, utilize) the result including the estimated deterioration state of the battery 210 diagnosed by the battery diagnostic device 120. For example, the output unit 130 may display the battery diagnosis result on the screen of a display device (not shown) or the like included in the vehicle 300, or provide the battery diagnosis result to an external device other than the vehicle 300 (such as a user's smartphone or a terminal of a vehicle dealer) via the communication unit 230 capable of wireless or wired communication.

Control

Also in the configuration of the second embodiment, as in the first embodiment, the battery diagnostic device 120 provided in the vehicle 300 can execute the battery diagnostic controls described in the first to fifth examples described with reference to FIGS. 2 to 6 and other examples. By executing these battery diagnostic controls, the various effects described above can be achieved.

Effect of Embodiments

The battery diagnostic device of the present disclosure described above sets a suitable diagnostic model from two or more diagnostic models based on the physical quantity indicating the state of the battery mounted on the vehicle, and estimates the deterioration state of the battery based on the set diagnostic model. With this control, the estimation accuracy of the deterioration state of the battery can be improved.

Assuming that at least one of the physical quantities is the voltage, the first diagnostic model can be set when the battery voltage is equal to or higher than the first threshold value, and the second diagnostic model can be set in other cases. At this time, the first diagnostic model is desirably an AI model that is machine-learned based on the voltage of the battery to which the protection circuit for suppressing the discharge amount is connected, and the second diagnostic model is desirably an AI model that is machine-learned based on the voltage of the battery to which the protection circuit is not connected. With this control, even when the battery diagnostic device cannot determine whether the protection circuit is connected to the battery, the optimum diagnostic model can be set for both a battery to which a protection circuit is connected and a battery to which a protection circuit is not connected, so that the estimation accuracy of the deterioration state of the battery can be improved. Further, the battery diagnostic control of the present disclosure is highly versatile because it can be applied to both a vehicle equipped with a battery to which a protection circuit is connected and a vehicle equipped with a battery to which a protection circuit is not connected.

Further, in the battery diagnostic device of the present disclosure, one diagnostic model can be set based on a physical quantity indicating the state of the battery at each predetermined timing in the initial period from when the battery is mounted on the vehicle until when the first time has elapsed, and it is possible not to make a new setting for the one diagnostic model after the initial period has elapsed. With this control, it is possible to estimate the deterioration of the battery after the lapse of the initial period based on the diagnostic model set in the initial period in which the presence/absence of the protection circuit can be clearly determined, so that the estimation accuracy of the deterioration state of the battery can be improved.

Here, when the two or more diagnostic models are the first diagnostic model and the second diagnostic model, either the first diagnostic model or the second diagnostic model can be set based on a physical quantity indicating the state of the battery in the initial period from when the battery is mounted on the vehicle until when the first time has elapsed, and the setting for changing from the first diagnostic model to the second diagnostic model can be prevented after the initial period has elapsed. With this control, for example, even when an erroneous determination of the initial period occurs due to a battery having a low voltage with a reduced SOC being mounted on the vehicle, the erroneous determination can be modified after the initial period has elapsed. In addition, it is possible to avoid erroneously determining the voltage drop due to battery deterioration that occurs after the initial period has elapsed as the low voltage of the battery output due to the absence of the protection circuit.

Further, it may be determined at each predetermined timing, in the initial period from when the battery is mounted on the vehicle until when the first time has elapsed, whether the voltage of the battery is equal to or higher than the first threshold value, and the first diagnostic model may be set when the number of times the voltage of the battery is determined to be equal to or higher than the first threshold value is equal to or larger than the second threshold value until when a second time, which is shorter than the first time, has elapsed, and the second diagnostic model may be set in other cases. With this control, even when the voltage of the battery fluctuates due to the influence of noise, the diagnostic model can be appropriately set in accordance with the frequency of the voltage appearing at the battery terminal.

Furthermore, one diagnostic model may be set based on the physical quantity indicating the state of the battery when the SOC of the battery is equal to or higher than the third threshold value or when the parking time of the vehicle is shorter than the fourth threshold value. Alternatively, a predetermined diagnostic model or a previously set diagnostic model may be set when the SOC of the battery is lower than the third threshold value or when the parking time of the vehicle is equal to or longer than the fourth threshold value. With this control, when the accuracy (reliability) of the voltage of the battery is low, the previously set diagnostic model is continuously used for estimating the deterioration of the battery without newly setting a diagnostic model, so that the estimation accuracy of the deterioration state of the battery is improved.

Although the embodiments of the present disclosure have been described above, the present disclosure can be applied to a battery diagnostic device, a battery deterioration estimation method executed by a battery diagnostic device including a processor and a memory, a control program for executing a battery deterioration estimation method, a computer-readable non-transitory storage medium that stores a control program, and a center or a vehicle equipped with a battery diagnostic device.

The battery diagnostic device of the present disclosure and the like can be used for diagnosing the state of a battery mounted on a vehicle.

What is claimed is:

1. A battery diagnostic device for diagnosing a state of a battery mounted on a vehicle, the battery diagnostic device comprising:
   an acquisition unit that acquires a physical quantity indicating the state of the battery;
   a setting unit that sets one diagnostic model from two or more diagnostic models based on the physical quantity acquired by the acquisition unit; and an estimation unit that estimates a deterioration state of the battery based on the one diagnostic model set by the setting unit, wherein:

the physical quantity includes at least a voltage, the setting unit sets a first diagnostic model when the voltage of the battery acquired by the acquisition unit is equal to or higher than a first threshold value corresponding to a battery having a protection circuit being connected thereto, and sets a second diagnostic model in other cases, the first diagnostic model is an artificial intelligence model (AI model) that is machine-learned based on the voltage of the battery to which the protection circuit for suppressing a discharge amount is connected, and the second diagnostic model is an AI model that is machine-learned based on the voltage of the battery to which the protection circuit is not connected.

2. The battery diagnostic device according to claim 1, wherein the setting unit sets the one diagnostic model based on the physical quantity acquired by the acquisition unit at each predetermined timing from when the battery is mounted on the vehicle until when a first time has elapsed, and does not perform a new setting for the one diagnostic model after the first time has elapsed.

3. The battery diagnostic device according to claim 1, wherein the setting unit sets one of the first diagnostic model and the second diagnostic model based on the physical quantity acquired by the acquisition unit at each predetermined timing from when the battery is mounted on the vehicle until when a first time has elapsed, and does not perform a setting of changing from the first diagnostic model to the second diagnostic model after the first time has elapsed.

4. The battery diagnostic device according to claim 1, wherein the setting unit determines, from when the battery is mounted on the vehicle until when a first time has elapsed, whether the voltage of the battery acquired by the acquisition unit at each predetermined timing is equal to or higher than the first threshold value, and sets the first diagnostic model when the number of times the voltage of the battery is determined to be equal to or higher than the first threshold value is equal to or larger than a second threshold value until when a second time that is shorter than the first time has elapsed, and sets the second diagnostic model in other cases.

5. The battery diagnostic device according to claim 1, wherein the setting unit sets the one diagnostic model based on the physical quantity acquired by the acquisition unit when a state of charge of the battery is equal to or higher than a third threshold value or when a parking time of the vehicle is shorter than a fourth threshold value.

6. The battery diagnostic device according to claim 1, wherein the setting unit sets a predetermined diagnostic model or a previously set diagnostic model when a state of charge of the battery is lower than a third threshold value or when a parking time of the vehicle is equal to or longer than a fourth threshold value.

7. A battery deterioration estimation method executed by a computer of a battery diagnostic device for diagnosing a state of a battery mounted on a vehicle, the battery deterioration estimation method comprising:

a step of acquiring a physical quantity indicating the state of the battery;

a step of setting one diagnostic model from two or more diagnostic models based on the acquired physical quantity; and a step of estimating a deterioration state of the battery based on the set one diagnostic model, wherein:

the physical quantity includes at least a voltage, the step of setting sets a first diagnostic model when the voltage of the battery acquired by the step of acquiring is equal to or higher than a first threshold value corresponding to a battery having a protection circuit being connected thereto, and sets a second diagnostic model in other cases, the first diagnostic model is an artificial intelligence model (AI model) that is machine-learned based on the voltage of the battery to which the protection circuit for suppressing a discharge amount is connected, and the second diagnostic model is an AI model that is machine-learned based on the voltage of the battery to which the protection circuit is not connected.

8. A non-transitory computer-readable storage medium storing instructions which, when executed by at least one processor, cause the at least one processor to perform a battery deterioration estimation process comprising:

a step of acquiring a physical quantity indicating the state of the battery;

a step of setting one diagnostic model from two or more diagnostic models based on the acquired physical quantity; and a step of estimating a deterioration state of the battery based on the set one diagnostic model, wherein:

the physical quantity includes at least a voltage, the step of setting sets a first diagnostic model when the voltage of the battery acquired by the step of acquiring is equal to or higher than a first threshold value corresponding to a battery having a protection circuit being connected thereto, and sets a second diagnostic model in other cases, the first diagnostic model is an artificial intelligence model (AI model) that is machine-learned based on the voltage of the battery to which the protection circuit for suppressing a discharge amount is connected, and the second diagnostic model is an AI model that is machine-learned based on the voltage of the battery to which the protection circuit is not connected.

9. A management center comprising:

the battery diagnostic device according to claim 1; and a communication unit that includes a processor that receives the physical quantity indicating the state of the battery transmitted from the vehicle and that sends the physical quantity to the acquisition unit.

10. A vehicle equipped with the battery diagnostic device according to claim 1.

* * * * *